United States Patent [19]

Nitt

[11] Patent Number: 4,696,631

[45] Date of Patent: Sep. 29, 1987

[54] APPARATUS FOR COMPRESSION MOLDING OF COIL END TURNS

[75] Inventor: Karl-Heinz Nitt, Wuerzburg, Fed. Rep. of Germany

[73] Assignee: Siemens Aktiengesellschaft, Berlin and Munich

[21] Appl. No.: 913,813

[22] Filed: Sep. 30, 1986

[30] Foreign Application Priority Data

Sep. 30, 1985 [DE] Fed. Rep. of Germany ....... 3534923

[51] Int. Cl.$^4$ ............................................ B29C 43/30
[52] U.S. Cl. ..................................... 425/117; 29/566; 29/596; 29/33 R; 264/272.2; 425/394; 425/406; 249/83
[58] Field of Search ....................... 29/596, 566, 33 R; 310/43; 264/272.2, 272.19; 425/117, 129, 383, 394, 406; 249/83

[56] References Cited

U.S. PATENT DOCUMENTS

| 1,982,279 | 11/1934 | Apple et al. | 18/34 |
| 2,019,064 | 10/1935 | Apple et al. | 18/42 |
| 3,058,156 | 10/1962 | O'Connor | 264/272.2 X |

FOREIGN PATENT DOCUMENTS 2327150  12/1973  Fed. Rep. of Germany .

Primary Examiner—Carl E. Hall

Attorney, Agent, or Firm—Volker R. Ulbrich; John L. James

[57] ABSTRACT

In order for a coil winding head, preferably to be reinforced by the baked-lacquer process, to be compression-molded with no need for preliminary pre-positioning by tape-wrapping and with no damage to the winding wires, a form shell apparatus is provided with a form core, which radially confines the coil end forms shape on the inside, with a radially advanced confining form shell divided into at least two parts in the circumferential direction. This multi-part shell radially confines the coil end turns on the outside. A compression form shell axially advanceable against the coil end turns confines the coil end turns in an axial direction. It has, on its inner and outer circumferential surfaces, integrally molded guide fingers, which extend axially in the direction of the coil end turns to be shaped. Corresponding guide grooves are molded into the form core and the confining form shell, into which guide grooves the guide fingers extend. Furthermore, the compression form shell has axial inner and outer compression fingers, which extend into the gaps of the coil winding head and press the winding of the said coil winding head in the radial or tangential direction. After assembly, the apparatus safely secures and protects the coil end turns in the desired position and shape.

7 Claims, 8 Drawing Figures

APPARATUS FOR COMPRESSION MOLDING OF COIL END TURNS

FIELD OF THE INVENTION

This invention relates to the field of electrical devices having electrical windings and more particularly to an apparatus for compression molding coil windings in a protective shell.

DESCRIPTION OF THE PRIOR ART

It is known from German Gebrauchsmuster No. 7,640,891 to provide a one-part mold shell, corresponding to the overall mold contour intended for the end turns of a coil. This known one part mold shell is pressed axially onto the end turns which extend beyond the end surface of the stator core until the front edge of the mold shell lies in contact with the end surface of the stator core. The coil end turns in this known apparatus must always be secured with tape, otherwise all the winding wires cannot be enclosed and pressed together, under adequate pressure from all sides, into the desired rounded shape for the end turns of the coil without damaging some of the windings.

SUMMARY OF THE INVENTION

It is therefore an object of this invention to provide an apparatus in which the coil end turns are molded in such a manner as to ensure the total subsequent operating safety of the electric motor, even when the coil end turns protrude out of the ends of the slots of the end surface of a stator core in the case of an electric motor having windings mechanically wound in such slots. It is a further object of this invention to provide such an apparatus for use with pre-wound coils which are mounted on a stator core to shape and protect the end turns of the pre-wound coil without pre-forming or pre-strengthening by any process subsequent to coil mounting, especially by tape wrapping.

Briefly stated in accordance with one aspect of this invention the aforementioned objects are achieved by providing an apparatus for compression molding of coil end turns, in particular of coil end turns which are not tape-wrapped, are generally cylindrical with an inside and outside, and are to be reinforced by the baked-lacquer process, with a form shell apparatus that can be pressed against the coil end turns. The apparatus includes: an inner form core as a part of said form shell apparatus, which radially confines the coil end turns form on the inside; a radially advanced outer confining form shell divided into at least two parts in the circumferential direction, which radially confine the coil end turns form on the outside; a compression form shell with an end surface contour for the coil end turns, which compression form shell can be advanced axially against the coil end turns. The outside and inside circumferential surfaces of the compression form shell outside of the end face contour of the coil end turns have outer and inner guide recesses cooperating with the inner and outer guide projections, respectively, into which said guide projections extend.

With the apparatus in accordance with the invention, it is possible, first, by inserting the form core axially and advancing the outer confining form shell radially, to determine the shape of the coil winding mold up to the axial opening of the compression form shell; the axial compression form shell can then be pushed axially forward against the coil end turns, largely independently of the filling factor of the form shell apparatus thus provided by the form core, the confining form shell and the compression form shell, until the winding wires of the coil end turns are placed under an adequate pressure from all sides, preferably with the attainment of plastic deformation. The guide fingers, which do not take up any of the space usable for the winding and nonetheless can be designed with adequate strength, can enclose all the winding wires without any danger of kinking when the compression form shell is advanced.

In order to guarantee adequate strengthening pressure on all winding wires from all sides, even in cases where, for example, the voids appearing in a winding which is wound in two stages cannot be completely filled by the axial pressure exerted by the compression form shell, one embodiment of the invention provides for molding additional inner or outer axial compression fingers integrally with the compression form shell. These inner and outer axial compression fingers extend into the gaps in the coil end turns and press the windings of said end turns in the radial or tangential direction when the compression form shell is advanced axially. Furthermore, in order to secure adequate spacing between the end surface of the stator core on the side toward the coil end turns and the windings of the coil end turns themselves, spacing projections on the confining form shell are provided. Preferably, these spacing projections extend radially into the gap between the end turns of the form core and the end surface of the stator core. In order for the form shells to be fabricated in accordance with the invention in an especially simple manner, provision is made that the guide projections, made as guide fingers, and the guide recesses, made as grooves, as well as the compression fingers and spacing projections, in each case in one piece, are molded onto the compression form shell or the reinforcing form shell or the inner form core respectively.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
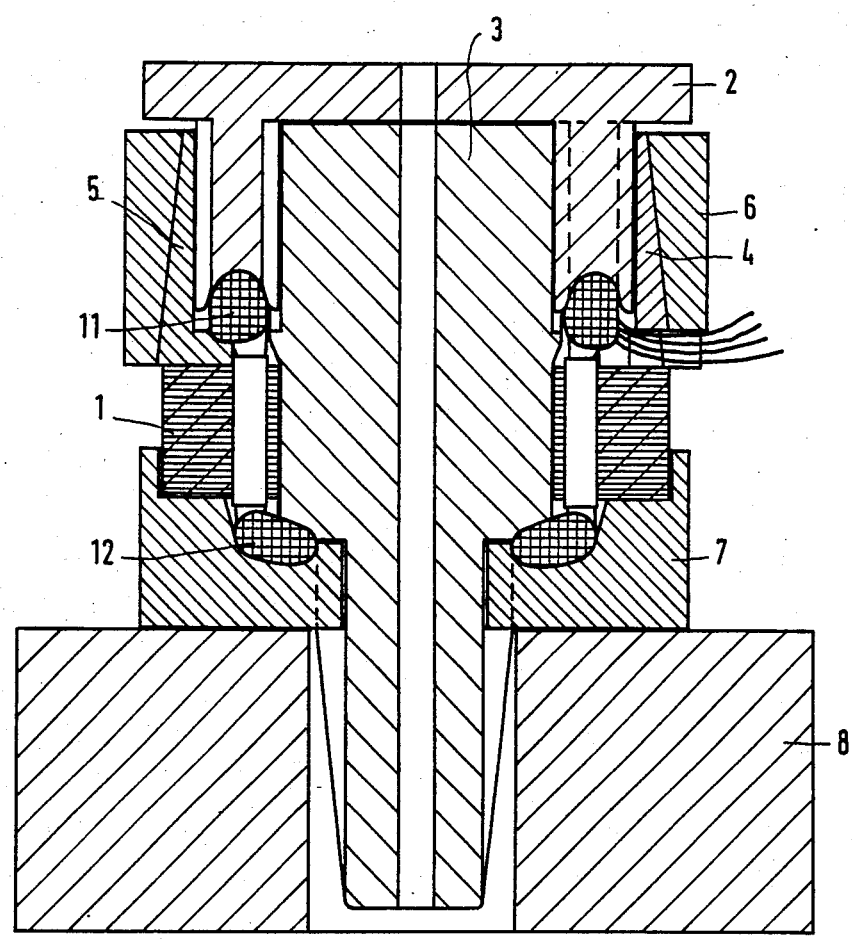
FIG. 1 shows, in cross section, the overall form shell apparatus having a wound stator core.
Figure 2:
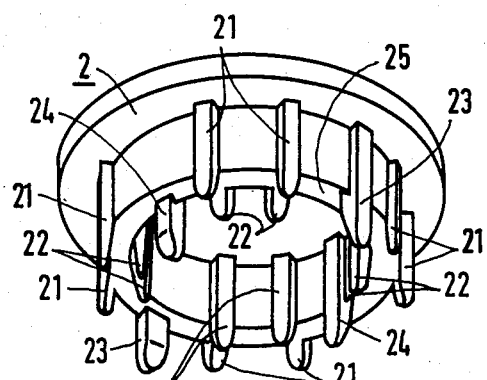
FIGS. 2 to 6 show, in various perspective, exploded views, the essential parts of the form shell apparatus.
Figure 3:
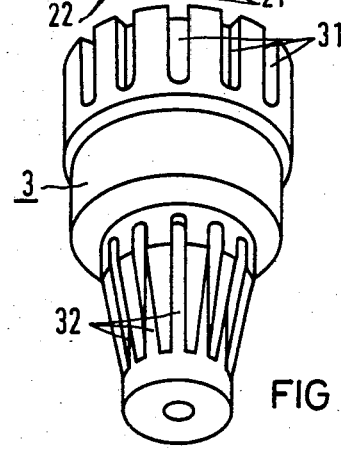

FIG. 1 shows the form shell apparatus, placed on a receiving apparatus 8, with stator core 1 and its compression-molded coil end turns 11,12 in place. The essential components of the form shell apparatus are first described on the basis of the perspective exploded views of FIGS. 2 to 6.

The form shell apparatus contains a bottom form shell 7, which shapes the bottom end turns of the coil 12, and a top compression form shell 2, which shapes the top end turns 11 of the coil. The compression form shell 2 consists essentially of a compression part, which has an arched contour 25 for the end face of the coil end turns, and the inner and outer circumferential surfaces of the compression part have outer guide fingers 21 and inner guide fingers 22 as well as outer compression fingers 23 and inner compression fingers 24, the fingers being integrally molded and axially extending over the end surface contour 25 of the coil end turns. An inner form core 3 has, on its top end, guide grooves 31 which cooperate with the inner guide fingers 22 and the inner compression fingers 24, respectively, of the compression form shell 2. On the bottom end, of the inner form core there are guide grooves which cooperate with inner guide fingers 71 of the bottom form shell 7.

Between the top part of the form core 3, with the guide grooves 31, and the bottom part of the form core, with the guide grooves 32, there is a middle part whose outer circumference is fitted to the rotor hole inside the stator core 1.

A confining form shell 4,5 is divided into at least two parts 4 and 5 respectively, which can be advanced radially and united. The confining form shell 4,5 has, on its inner circumferential surfaces, guide grooves 41 and 51 corresponding to the outer guide fingers 21 and compression fingers 23, respectively, of the compression form shell 2. The bottom edge of the confining form shell 4,5 has spacing projections 42,52, which are radially and integrally molded. When both parts of the confining form shell 4,5 are laid against the coil end turns 11 which are to be molded, the spacing projections ensure an adequate spacing between the end surface of the stator core 1 and the winding wires of the coil end turns 11 that extend beyond the stator core end surface. In one half of the confining form shell 4,5, an opening 43 is provided for mounting a universal terminal on the stator core, by which the ends of the coil winding can, preferably, be pre-positioned or contacted, for example with automatic temperature controllers preconnected to the universal terminal and with connections for external power supply lines.

Figure 5:
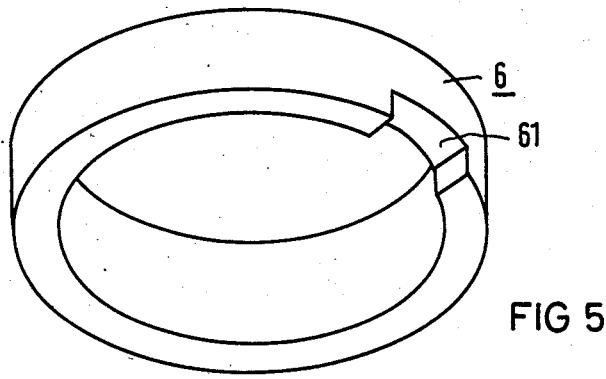

FIG. 5 shows a pressure ring 6 that can be slipped over the outside of the two-part confining form shell 4,5 to hold it together. Pressure ring 6 also has an opening 61, corresponding to the opening 43 in the confining form shell 4,5, for the universal terminal which is subsequently mounted on the stator core 1. Pressure rings that can be axially slipped over the outside may be replaced by, for instance, radially advanceable pressure jaws.

Figure 6:
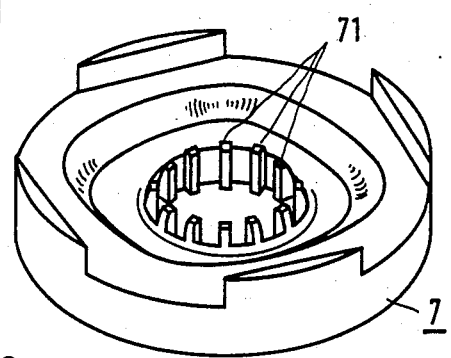
Figure 4:
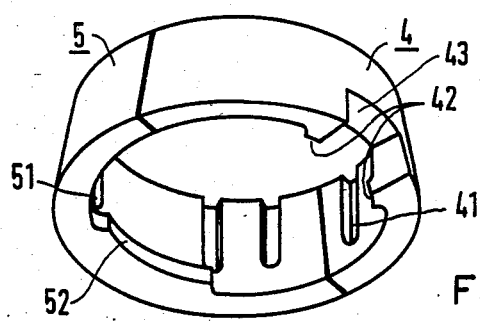

Finally, FIG. 6 shows the bottom form shell 7, which also has guide fingers 71 on its inside, by means of which the winding wires of the coil end turns 12 are enclosed in a funnel-like fashion and the contour of the bottom form shell surface is applied to the end face of the coil end turns. This contour is impressed into the bottom form shell 7 as a form surface that is not rotationally symmetric but is otherwise closed.

For the compression molding of the coil end turns, the stator core 1, with the premolded or only loosely wound coil end turns 11,12, as shown in FIG. 1, is placed in the bottom form shell 7 with the form core 3 inserted. At this time, by means of the guide fingers 71, the wires of the bottom coil end turns 12 are applied, in their entirety, to the coil end turns shape predetermined by the bottom form shell 7 as a closed contour. By this embodiment there is no danger of damage or kinking during this process. Next, for the molding or shaping of the top coil end turns 11, to whose formation the features of this invention essentially pertains, the two parts of the outer confining form shell 4,5 are advanced radially toward one another around coil end turns 11. The radial spacing projections 42,52 extend under the bottom surface of the coil end turns 11 and ensure an adequate spacing between the end surface of the stator core 1 and the portions of the coil end turns 11 that extend beyond the stator core end surface. After the previous molding by the outer confining form shell 4,5, on the one hand, and the inner form core 3 on the other, the desired contour of the coil end turns 11 is completed by inserting the top compression form shell 2 axially into the open space between form core 3 and confining form shells 4,5.

When the compression form shell 2 is inserted axially, the guide fingers 21,22 slide into the corresponding guide grooves 31 of the inner form core 3. It is preferable for the guide fingers 21,22 to be arranged outside the contour 25 of the end surface of the coil end turns, and also to extend radially into the corresponding guide grooves 31 of the form core 3; as a result, on the one hand no space usable for the winding is wasted, and on the other hand the guide fingers 21,22 can be designed in an adequately safe manner for the procedure and can be provided with chamfered edges at their free ends, so as to form a funnel-shaped enclosure for the mating parts of the coil end turns.

Figure 8:
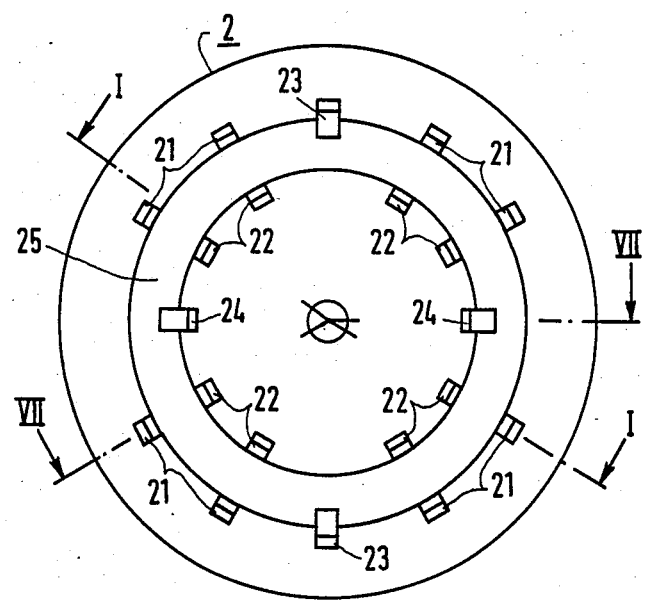
FIG. 8 shows an end view of an assembled compression form shell.

When the compression form shell 2 is inserted axially, the winding wires are preferably pushed into gaps already present and pressed against the boundary of the inner form core or of the outer confining form shell, a plastic deformation being achieved. So that pressure can be exerted from all sides on all the winding wires, even for example to the end turns of multiple-layer coils provided with offset coil groups in the gaps of adjacent coil groups one atop another. One embodiment of the invention provides for the compression form shell 2 further to have integrally molded inner and outer compression fingers 23 and 24 respectively, which (as shown, in particular, in FIGS. 7 and 8) also extend partway into the region of the end surface contour 25 of the coil end turns 25 of the compression form shell 2, in contrast to the guide fingers 21,22.

Figure 7:
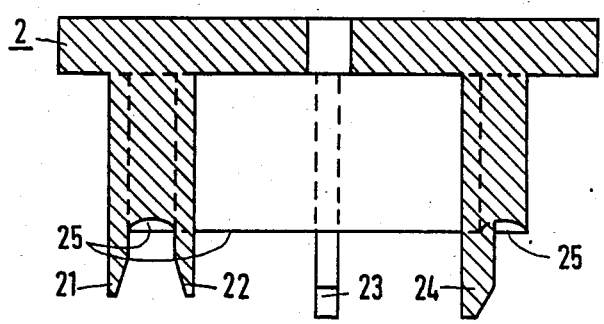
FIG. 7 shows, in cross section, the compression form shell with one inner guide finger and one outer guide finger and one inner compression finger and one outer compression finger.

As the guide fingers 21,22, the compression fingers 23,24 are also preferrably provided with chamfered edges at their free ends, so as to form a gradual funnel-shaped enclosure of the adjacent winding wires. In order for these essential features to be illustrated more clearly, FIG. 7 is simplified to show only the guide fingers which appear in the section view VII—VII of FIG. 8. The spacing of the outer compression fingers 23 and of the inner compression fingers 24 in FIG. 8 corresponds to the molding of a two-pole, single-phase winding arranged in two winding layers each with a principal phase and a secondary phase, and thus to a total of four coil groups, the gaps between two adjacent coil groups alternating from the top to the bottom winding layer and being spaced 90 degrees apart at the circumference.

The apparatus for compression molding of pre-positioned or only loosely wound, coil end turns in accordance with the invention, which apparatus is especially simple to fabricate and easy to service, ensures damage-free enclosure of all winding wires and a deforming pressure such that all the winding wires, after compression molding and baked-lacquer reinforcement, which may be provided as a subsequent step. The winding wires are thus secured with the desired end face contour of the coil end turns provided without any danger of these wires springing back or coming loose from their fastening apparatus.

It will now be understood that there has been disclosed an improved apparatus for compression molding and securing the end turns of coil windings. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. Apparatus for compression molding of coil end turns, which are generally cylindrical and have an inside and an outside and which apparatus includes a form shell that is pressed against the coil end turns, comprising:

an inner form core as a part of the form shell which radially confines the coil end turns on the inside;

a radially advanced outer confining form shell divided into at least two parts in the circumferential direction, which radially confine the coil end turns on the outside;

a compression form shell with an end surface contour for engaging the coil end turns, which compression form shell is advanced axially against the coil end turns;

an outside and an inside circumferential surface of the compression form shell having respective outer and inner guide projections projecting axially in the direction of the coil end turns, said guide projections extending over the outer surfaces and inner surfaces of the coil end turns; and the outer confining form shell and the inner form core having inner and outer guide recesses, cooperating with the inner and outer guide projections, respectively, into which guide recesses the inner and outer guide projections extend.

2. Apparatus according to claim 1 wherein:

the outer and inner guide projections consist of outer and inner guide fingers, spaced over the outer and inner circumferences of the compression form shell; and the guide recesses consist of cooperating outer and inner guide slots in the inner form core and in the outer confining form shell, respectively.

3. Apparatus according to claim 1, wherein the compression form shell has axial outer and inner compression fingers, which extend into the gaps of the coil end turns and press the windings of the coil end turns in the radial and tangential directions.

4. Apparatus according to claim 1, wherein the confining form shell has spacing projections projecting radially into the gap between the coil end turns and an end surface of a stator lamination stack.

5. Apparatus according to claim 2, wherein the guide fingers and compression fingers are integrally molded onto the compression form shell, and the guide grooves are integrally molded into the inner form core and into an outer reinforcing form shell, respectively.

6. Apparatus according to claim 5, wherein the spacing projections are integrally molded onto the reinforcing form shell.

7. Apparatus according to claim 2 wherein the guide fingers and compression fingers and spacing projections have chamfered edges on their free ends with the winding of the coil end turns forming a funnel-shaped enclosure.

* * * * *